March 12, 1957  O. C. KINDORF  2,784,812
STRUCTURAL BEAM AND CONNECTING MEANS
Filed Aug. 18, 1953
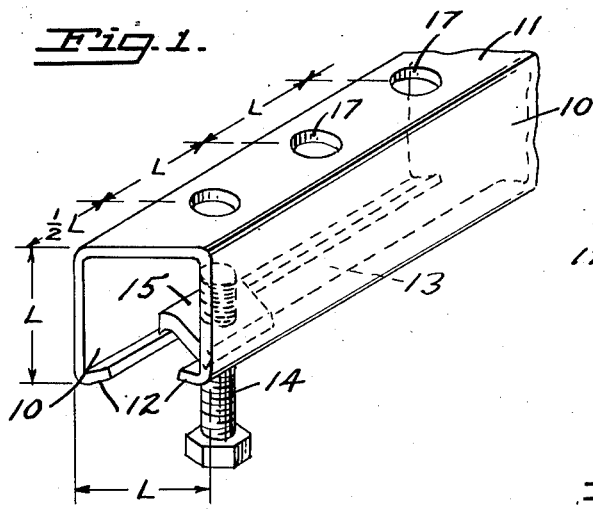
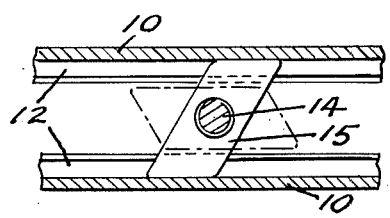
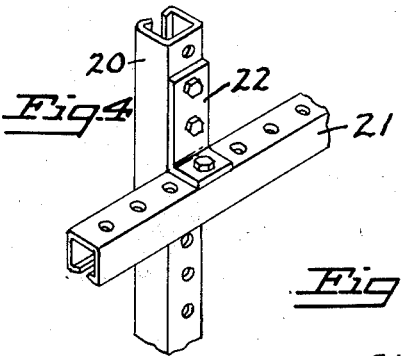
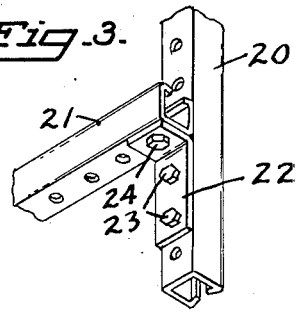
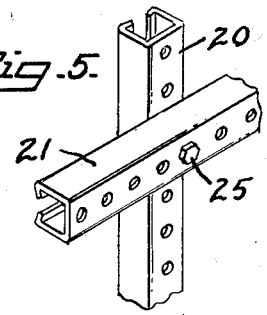
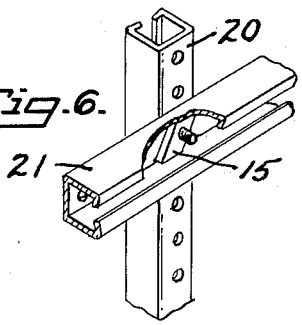
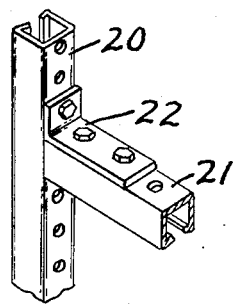
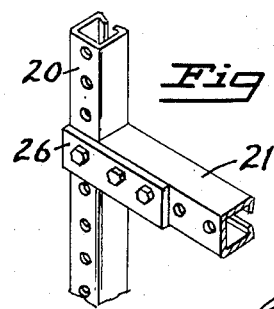
INVENTOR.
ORLAN C. KINDORF
BY
Charles M Fryer
ATTORNEY United States Patent Office 2,784,812
Patented Mar. 12, 1957

2,784,812
STRUCTURAL BEAM AND CONNECTING MEANS

Orlan C. Kindorf, Oakland, Calif.

Application August 18, 1953, Serial No. 374,963

2 Claims. (Cl. 189—36)

This invention relates to a beam and means for connecting beams together in the production of structural shapes. The particular type of beam to which the invention pertains is a special channel originally developed for the purpose of supporting pipes and electrical conduits and cables in buildings and other structures in which they are installed. However this channel has become widely accepted for use in the building of other structures such as shelving, bins, and storage racks for various kinds of merchandise. Since the beam is of channel-shape in cross-section, it has what will be referred to herein as an open or slotted front.

In building the kind of structures referred to above, it is often necessary that this open front assume a certain position or direction where it will best serve to receive pipe hangers, shelf edges or other members combined with the beam to serve some particular purpose. The slotted front of the beam is employed in conjunction with bolts and connecting fittings in a manner that will become apparent as the description proceeds. Because of this fact, the respective positions of two beams joining or crossing each other has been limited, and a great number of connecting fittings of different configurations have been developed to make it possible to face the slotted front of a particular beam in the direction desired.

In the present invention, a simple expedient has been employed to add greatly to the usefulness of the beam referred to and make it more adaptable to use in various positions with a much smaller number of connecting fittings. This, of course, reduces cost in that comparable structures can be assembled with the new beam with fewer and simpler fittings.

It is, therefore, the object of this invention to provide an improved beam capable of assembly in a wide choice of positions with simplified connecting fittings.

Further and more specific objects and advantages of the invention will be made apparent in the following specification where, by reference to the accompanying drawings, the invention is disclosed in detail.

In the drawings:

Fig. 1 is a perspective view of a short length of beam embodying the present invention and showing a bolt with a special nut, employed as securing means, in place therein;

Fig. 2 is a central horizontal sectional view of the structure illustrated in Fig. 1 showing the manner of assembly of the special nut in the beam;

Figs. 3 to 8 inclusive are perspective views of two beams secured together in various positions with the aid of bolts and simple fittings.

Referring first to Fig. 1 of the drawings, the beam of the present invention is illustrated as having a pair of side walls 10 connected by a back wall 11. Flanges 12 are bent from the edges of the side walls and terminate short of each other to leave a central space or slot 13 throughout the length of the beam so that the beam is, generally speaking, of square tubular shape with a longitudinal slot extending throughout the length of one wall which, for the purpose of this description, may be considered the front wall. The flanges 12 are bent somewhat beyond a right angle to form acute angles with the inner surfaces of the side walls 10 for cooperation with a special nut in a manner fully described in my co-pending application entitled "Beam Structure and Associated Securing Means," Serial No. 269,994, filed February 5, 1952, now Patent No. 2,676,680. A threaded rod or bolt 14 is held in place by a special nut 15. The blank of the nut 15 is shaped as an elongated parallelogram having a narrow dimension slightly less than the width of the slot 13 so that it may be readily inserted into the beam at any point throughout its length. The position of the nut 15 as it is being inserted is shown in broken lines in Fig. 2 of the drawings. The greater dimension of the nut is such as to span the space between the side walls 10 of the beam with the ends of the nut in parallelism therewith as best illustrated in Fig. 2 and to be supported within the beam by contact with the inner surfaces of the flanges 12. This nut, as also clearly described in my co-pending application referred to above, is preferably shaped to provide points or prongs at its four corners which pierce or bite into the surface of the metal of which the beam is formed to deter slipping of the nut longitudinally of the channel after the screw 14 is tightened.

As described to this point, the beam and securing means are identical with those disclosed in my said co-pending application. The present invention, however, modifies this beam by the provision in the back wall 11 thereof of a series of perforations shown at 17, the arrangement and spacing of which with respect to the size of the beam is such as to enable two like beams to be assembled in numerous positions relative to each other with the use of simple fittings secured in place by nuts and bolts like those shown at 15 and 14 respectively.

In the first place, the beam of the present invention must be constructed as a concise square, that is with the distance between the side walls corresponding exactly to the distance between the back wall and the plane referred to as the front slotted wall. A second requirement is that the perforations 17 in the back wall be formed on centers, the spacing of which also equals the size of the square. A third requirement is that the end of the beam must terminate at a point one-half the spacing of the perforations from the center of the perforation nearest the end. Thus by referring to Fig. 1 wherein the distances L are all equal, it is apparent that the width and breadth of the beam as well as the spacing between the perforations 17 are identical while the distance between the end of the beam and the center of the first perforation is one-half the fixed dimension L. Since the beams are manufactured in standard lengths and cut to lengths required for the building of a specific structure, the cut must always be made half way between two of the perforations 17. With a dimension of one and one-half inches substituted for the length L as an example, it is possible to vary the various dimensions of a completed structure in increments of one and one-half inch.

Now referring to Figs. 3 to 8, inclusive, each of which shows a different combination of two beams as they may be used in various structural assemblies. The application of simple fittings for connecting the beams is shown. In these figures, vertical beams are all indicated by the reference character 20 whereas horizontal beams are indicated by the reference character 21. In Fig. 3 the horizontal beam 21 lies adjacent the back of the vertical beam 20 with its open front directed upwardly or in other words, the beams are connected in a side to back relationship and this connection is made by a simple angle bracket 22 connected to the back of the beam 20 by bolts 23 and to the back of the beam 21 by a bolt 24. For convenience in assembly, all of these bolts may have the same special nut as shown at 15 in Figs. 1 and 2 which bears against the inside of the back of the beams rather than on the flanges 12 and is held against rotation by the sides 10 while the bolt is tightened into place. While the slotted front of the beam 21 of Fig. 3 faces upwardly, it may be desired to make a similar connection with this slotted front facing downwardly and this is accomplished in the manner illustrated in Fig. 4 with the use of the same simple angle bracket 22. Should it be desired to assemble the beam 21 with its slotted front facing inwardly or outwardly with respect to the vertical beam 20, the angle bracket 22 may be eliminated and the connection may be made with a simple nut and bolt as illustrated in Fig. 5 wherein the bolt is shown at 25 and passes through perforations in the backs of both beams with a special nut 15 disposed within the vertical beam 20. Reversal of the beam 21, as illustrated in Fig. 5, may readily be accomplished by using a slightly shorter bolt 25 so that the two beams assume a back to back position. This latter position is illustrated in Fig. 6 wherein a portion of the beam 21 is broken away to illustrate the position occupied by the nut 15 therein.

Typical assemblies where the beams 20 and 21 are arranged in abutting relationship are illustrated in Figs. 7 and 8. In Fig. 7 the angle bracket 22 is employed to connect the beams with the open front of the beam 21 facing downwardly and with the beam 21 abutting the back of the beam 20. As is apparent from Fig. 7, either the beam 20 or 21 may be rotated through 180° to assume an opposite position and still be connected with the simple angle bracket 22. Where it is desired to rotate the beams only 90° from the positions illustrated in Fig. 7, a flat plate bracket 26 is employed as shown in Fig. 8 and the bolts in this case may be inserted either through the perforations 17 or the slot 13 in the open front so that either or both of the beams may again be rotated to 180° from the positions shown and still be secured in place by a simple perforated plate bracket such as that illustrated at 26.

No attempt is made herein to illustrate all of the brackets that may be employed in different combinations for joining two or more beams during their assembly into a structural unit. It is, however, the purpose of the present description to illustrate the advantages of a square beam with a slot or opening on one side and with perforations on its opposite side formed at intervals corresponding in length to the outer dimensions of the square of the beam itself.

I claim:

1. Structural beams of rectangular cross section each having a central longitudinal slot throughout one of its walls and having in its opposite wall a longitudinal row of perforations disposed centrally thereof, and means securing one beam to another in contact with each other and in right angular relationship, said means including a bracket disposed in overlapping relation with and fitting against adjacent portions of said beams and having perforations spaced to register with perforations in said beams, a bolt extending through one of the perforations of each of the beams and through one of the perforations of said bracket, and an elongate nut on each of said bolts disposed within each one of the beams with end portions of the nut engaging opposing faces of the two other side walls of the beam, said nuts each being of a width to be inserted through the longitudinal slot of the beams and of a length greater than the distance between said two other side walls of the beams, the exterior dimensions of each beam in cross section and the spacing of the perforations therein and the spaces between the ends of each beam and the centers of perforations adjacent the ends of the beam, and the spaces between the sides of the beam and the centers of said perforations being all measured by integral multiples of a common increment, said increment being one-half the width of the beam, whereby the beams may be placed in a variety of positions adjacent one another with the bracket in overlapping relationship with adjacent portions thereof, and with perforations of the bracket registering with perforations in the beams to facilitate the connection of one beam to another.

2. Structural beams of rectangular cross section each having a central longitudinal slot throughout one of its walls and having in its opposite wall a longitudinal row of perforations disposed centrally thereof, and means securing one beam to another in contact with each other and in right angular relationship, said means including a bracket having right angularly related portions, the bracket being disposed with its angularly related portions fitting against adjacent portions of the beams, and said bracket having perforations spaced to register with perforations in the beams, a bolt extending through one of the perforations of each of the beams and through one of the perforations of said bracket, and an elongate nut on each of said bolts disposed within each one of the beams with end portions of the nut engaging opposing faces of the two other side walls of the beam, said nuts each being of a width to be inserted through the longitudinal slot of the beams and of a length greater than the distance between said two other side walls of the beams, the exterior dimensions of each beam in cross section and the spacing of the perforations therein and the spaces between the ends of each beam and the centers of perforations adjacent the ends of the beam, and the spaces between the sides of the beam and the centers of said perforations being all measured by integral multiples of a common increment, said increment being one-half the width of the beam, whereby the beams may be placed in a variety of positions adjacent one another with the bracket in overlapping relationship with adjacent portions thereof, and with perforations of the bracket registering with perforations in the beams to facilitate the connection of one beam to another.

References Cited in the file of this patent

UNITED STATES PATENTS

| | | |
|---|---|---|
| 1,242,202 | Keller | Oct. 9, 1917 |
| 1,963,395 | Zabriskie | June 19, 1934 |
| 2,166,095 | Kotrbaty | July 11, 1939 |
| 2,345,650 | Attwood | Apr. 4, 1944 |
| 2,676,680 | Kindorf | Apr. 27, 1954 |